United States Patent [19]
Gundlach

[11] 3,715,209
[45] Feb. 6, 1973

[54] ELECTRICAL COLOR MASKING IN A PHOTO ELECTROPHORETIC IMAGING PROCESS

[75] Inventor: Robert W. Gundlach, Victor, N.Y.
[73] Assignee: Xerox Corporation, Rochester, N.Y.
[22] Filed: Feb. 27, 1970
[21] Appl. No.: 15,103

[52] U.S. Cl. ...................96/1.2, 96/1.3, 96/1.4, 96/1 R, 355/3, 355/4
[51] Int. Cl. .............................G03g 13/22
[58] Field of Search .......96/1, 1.2, 1.3, 1.4; 204/181, 204/299, 300

[56] References Cited

UNITED STATES PATENTS

| 3,010,842 | 11/1961 | Ricker | 117/37 LE |
| 3,477,934 | 11/1969 | Carreira et al. | 204/181 |
| 2,986,466 | 5/1961 | Kaprelian | 96/1.2 |
| 3,535,221 | 10/1970 | Tulagin | 204/181 |
| 3,565,614 | 2/1971 | Carreira et al. | 96/1.4 |

Primary Examiner—Charles E. Van Horn
Attorney—James J. Ralabate, David C. Petre and Michael H. Shanahan

[57] ABSTRACT

The densities of pigments comprising an image are altered in electrophoretic imaging systems by supressing or enhancing pigment migration in an electric field by employing in selected areas electrostatic charge to increase or decrease the field effecting migration.

7 Claims, 2 Drawing Figures

INVENTOR.
ROBERT W. GUNDLACH

ELECTRICAL COLOR MASKING IN A PHOTO ELECTROPHORETIC IMAGING PROCESS

BACKGROUND OF THE INVENTION

This invention relates to photoelectrophoretic imaging systems and in particular to methods and apparatus for correcting color in images produced by such systems.

A detailed description of the photoelectrophoretic process is given in U.S. Pat. Nos. 3,384,488 and 3,384,565 to Tulagin and Carreira, U.S. Pat. No. 3,384,566 to Clark and U.S. Pat. No. 3,383,993 to Yeh and the disclosures of those patents are incorporated herein by reference. Briefly, image formation takes place by creating an electric field across an ink or suspension comprised of electrically charged photosensitive pigments suspended in an electrically insulating fluid. The charged pigments or particles are attracted to either an injecting or blocking electrode between which the electric field is established. Normally, one of the electrodes is transparent, preferably the injecting electrode, and the pigments adjacent thereto are exposed to electromagnetic radiation. Those pigments that absorb the radiation experience an apparent change in charge polarity and migrate under the influence of the field toward the blocking electrode leaving a positive ink image on the injecting electrode and depositing a negative ink image on the blocking electrode. The injecting electrode is so named because it is designed to optimize the charge exchange with the pigments while the blocking electrode is so named because it is designed to minimize the charge exchange with the pigments.

Color images are normally made with the photoelectrophoretic process by exposing to the light emitted from an original flooded with white light an ink composed of yellow, magenta and cyan photosensitive pigments which ideally are exclusively absorbant of blue green and red light , respectively. The three pigments are positioned generally side by side and when viewed from a distance appear to the human eye as solid areas having colors depending upon the percentage of the various pigments in a unit area. Color correction is necessary because presently known pigments have non-ideal responses to their respective portions of the visible light spectrum. Yellow pigments are generally closest to the ideal absorbing substantially blue light only. Magenta and cyan pigments, unfortunately, deviate considerably from the ideal model. Magenta pigments primarily absorb green light but also absorb blue light. Cyan pigments primarily absorb red light but also absorb blue and green light. Consequently, color correcting normally involves reducing the density of yellow pigment in those areas also containing magenta and cyan pigments because too much blue light is otherwise absorbed in those areas. The quantity of yellow pigment removed is generally proportional to the excess quantity of blue light being absorbed, i.e. proportional to the density of the magenta and cyan in the same area. Similarly, the density of the magenta pigments is reduced in those areas also containing cyan pigment because too much green light is otherwise being absorbed in those areas. Here, the quantity of magenta pigment removed is generally proportioned to the density of the cyan pigment.

Photographic color masks are commonly used to effect the desired reduction in pigment densities, i.e. the color correction. The intensities or brightness levels of the blue, green and red light emitted from an original are inversely proportional to the density of the yellow, magenta and cyan colors in the original, respectively. Black and white photographic negatives recording the intensities of the blue, green and red light emissions, however, transmit light having intensities directly proportional to the densities of the yellow, magenta and cyan areas in the original. The three negatives are termed color separation negatives and the light transmitted by them is used to determine the location and density of the yellow, magenta and cyan pigments in a final color reproduction. Black and white photographic positives made from the green and red separation negatives are the most commonly used color masks. The green and red separation positives are superimposed over the blue separation negative and reduce the intensity of the transmitted light, i.e. the density of yellow pigment, in the yellow areas of the original also containing magenta and cyan. Similarly, the red separation positive is superimposed over the green separation negative and reduces the intensity of the transmitted light, i.e. the density of the magenta pigment, in the magenta areas of the original also containing cyan. Because of the amount of materials and the number of steps involved, these color correction techniques have proven expensive and time consuming.

Accordingly, it is an object of this invention to overcome the limitations of known color correction techniques.

Specifically, it is an object of the present invention to simplify color correction for electrophoretic imaging systems by using electrical color masks.

Another object of the invention is to effect color correction in electrophoretic imaging systems by altering the electric field intensities effecting the movement of the particles that form an image.

Another object of the invention is to alter the density of a photoelectrophoretic image by altering the electric field effecting migration of the pigments comprising the image.

Yet another object of this invention is the improvement of the photoelectrophoretic imaging process.

In the present invention a color image is composed from three separate yellow, magenta and cyan photoelectrophoretic ink images or color separation images that are transferred in registration to a record member. The three separation images are formed on injecting electrodes from yellow, magenta and cyan inks that are exposed to the blue, green and red light, respectively, emitted from an original. The yellow and magenta separation images are color corrected by increasing the electric field applied across the ink in the areas that the pigment density is to be reduced. The density is reduced because the increased field increases the number of pigments migrating from the injecting electrode for a given exposure. The electric field is increased by an electrostatic image on a blocking electrode shaped in the configuration of a positive image of the green and/or red light emitted by the original. These electrostatic images are called electrical color masks.

DESCRIPTION OF THE DRAWINGS

Other objects and features of the present invention will be apparent from a further reading of the present description and from the drawings which are.

DESCRIPTION OF THE INVENTION

Figure 2:
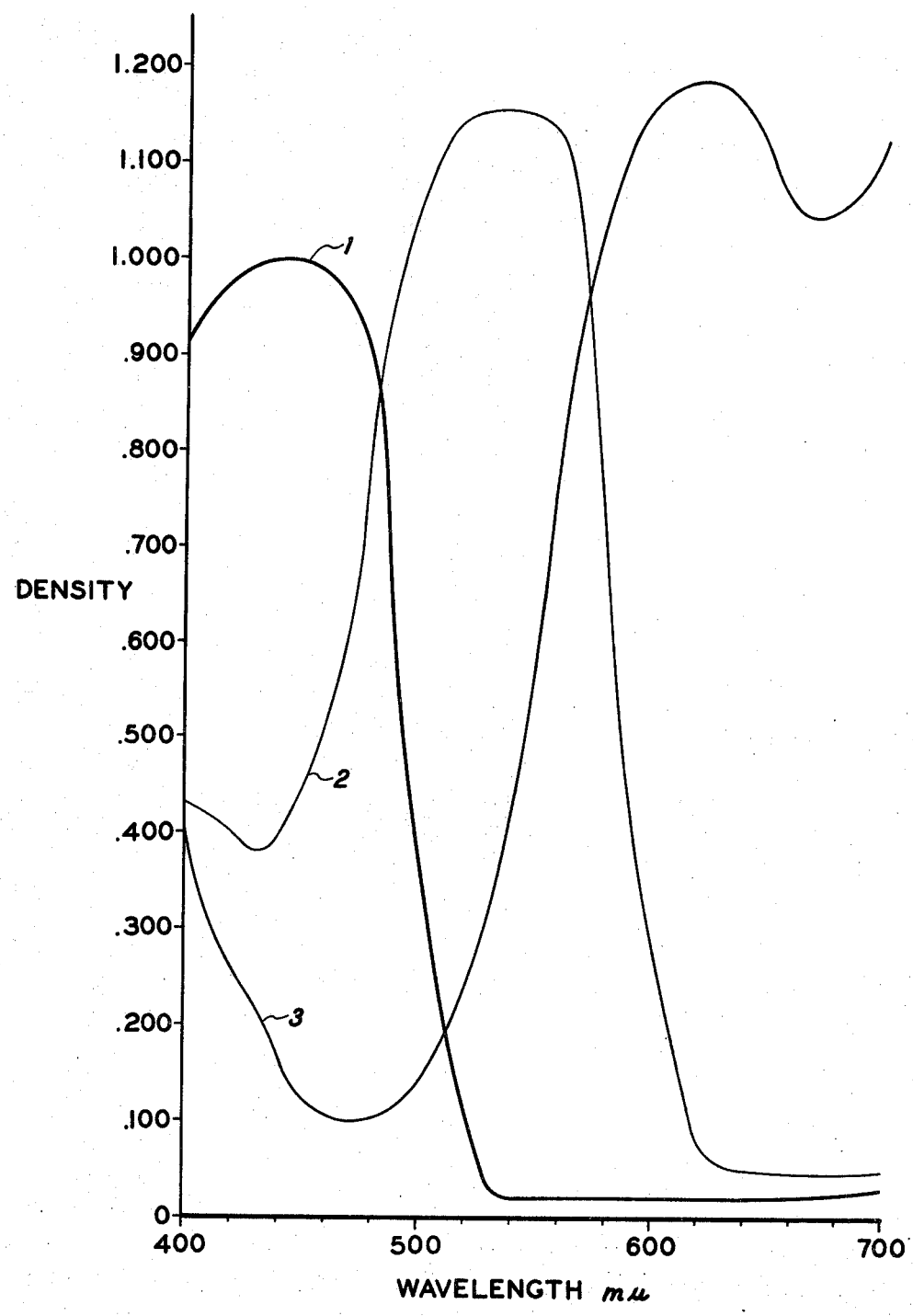
FIG. 2 is a plot of the absorption characteristics of yellow, magenta and cyan pigments over the visible light spectrum.

Curves 1, 2 and 3 in FIG. 2 depict generally the response of yellow, magenta and cyan photoelectrophoretic inks, respectively, to the visible light spectrum. These curves are helpful in understanding the color subtraction mechanism used in the present photoelectrophoretic color imaging system. Ink pigments are attracted to an injecting electrode by the electric field and they migrate toward the blocking electrode, i.e. are subtracted from the injecting electrode, when exposed to light if they exchange charge with the injecting electrode. Charge exchange occurs with those pigments in the electric field that absorb the incident electromagnetic radiation. Consequently, yellow pigment is subtracted from the injecting electrode in the blue emitting areas of an original while magenta is subtracted from the green emitting areas and cyan from the red emitting areas.

The intensity or brightness of blue light, for example, is inversely proportional to the quantity of yellow color in the original. The yellow remaining on the injecting electrode therefore is directly proportional to the amount of yellow in the original. Actually, the quantity of yellow pigment or ink remaining on the injecting electrode is in error because not all the blue light is absorbed by the yellow pigment, not all the pigments exchange charge with the injecting electrode, or if they do, they remain at the injecting electrode for diverse reasons, and the yellow particles absorb some radiation in the green and red portions of the spectrum. The total error or deviation from the correct proportion between yellow pigment on the injecting electrode and yellow color in the original is herein referred to as the "inherent error" of the yellow pigment.

Similarly, green light impinging upon a magenta ink subtracts magenta pigments from an injecting electrode by an amount, at least ideally, that leaves a quantity directly proportional to the amount of magenta color in the original. Again, the quantity of magenta pigment on the injecting electrode differs from the ideal because of the "inherent error" of the magenta pigment, which is analogous to the inherent error of the yellow pigment. Likewise, the red light incident on a cyan ink subtracts cyan pigments from the injecting electrode by an amount, at least ideally, that leaves a quantity directly proportional to the quantity of cyan color in the original. Again, the "inherent error" of the cyan pigment, analogous to the inherent error of the yellow pigment, causes the amount of cyan pigment remaining on the injecting electrode to be in error.

The present invention is primarily directed toward correcting errors arising in areas of a reproduction containing two or more pigments rather than toward correcting the "inherent error" of a single pigment. In areas of a reproduction containing two or more pigments, a substantial portion of the color error is due to the fact that at least one pigment is responsive to wavelengths outside its ideal spectral response region. By way of example, a color in an original that is a combination of 50 percent yellow and 50 percent magenta emits light proportional to one unit green light, one unit blue light and two units red light. The unit of blue light drives (ideally) 50 percent of the yellow pigment from an injecting electrode leaving a layer of yellow pigment behind directly proportional to the amount of yellow in the original. The unit of green light drives (ideally) 50 percent of the magenta pigment from an injecting electrode and the two units of red light drive (ideally) all the cyan pigment from an injecting electrode. When the blue and green separation images are laid in registration the composite image is 50 percent yellow and 50 percent magenta. Unfortunately, when this composite image is viewed under a white light, it reflects (or transmits if it is a transparency) light generally proportional to 0.75 units blue light, 0.9 units green light and 1.9 units of red light. The low output of blue light is due primarily to the fact that the magenta pigment absorbs an appreciable amount of blue light and the resultant image appears too yellow. This error is corrected by reducing the amount of yellow pigment wherever magenta pigment is also required. In the present example, removing 25 percent of the yellow pigment in the areas also containing magenta pigment enables the reproduction to more accurately simulate the color of the original. Similar examples can be constructed illustrating that yellow and cyan pigments and magenta and cyan pigments more accurately represent a like color combinations in an original by reducing the density of the yellow and magenta pigments in the areas also containing cyan pigment. With the aid of such examples, one skilled in the art can readily devise methods for calibrating the amount of one pigment that should be removed from areas containing a pigment having a spectral response region that overlaps into that of the first pigment. Experience has shown that substantial amount of the color error in a reproduction is corrected by reducing the yellow pigment density where there is magenta and/or cyan pigments and reducing magenta pigment density where there is cyan pigment. An initial inspection of the overlap between the curves in FIG. 2 explains why the specifically mentioned corrections are so effective and further comparisons of the curves suggests other density changing schemes that result in even more color correction and/or enhancement.

Figure 1:
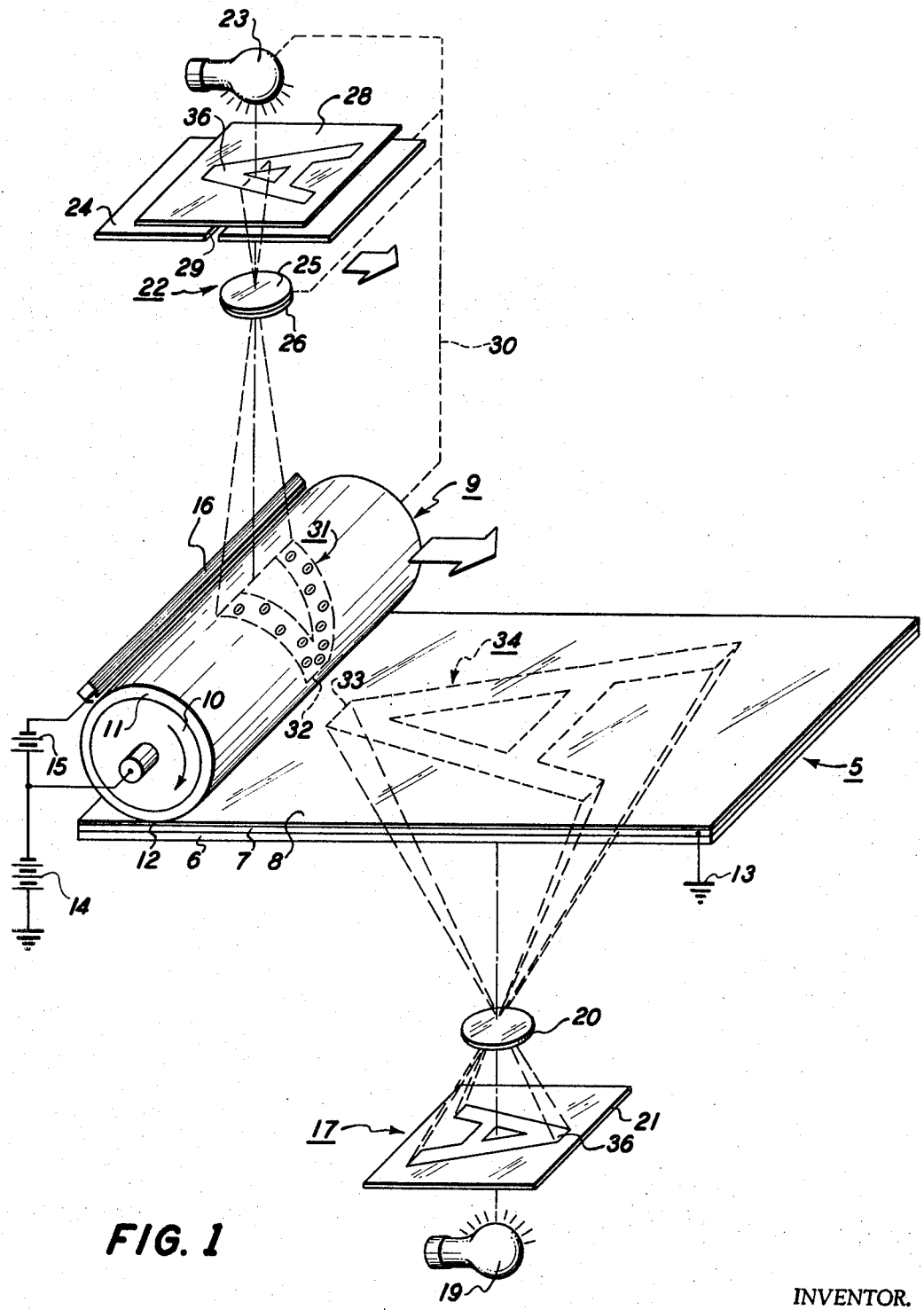
FIG. 1 is a schematic of a photoelectrophoretic imaging system utilizing an electrical color correcting mask.

Turning now to FIG. 1, the system injecting electrode 5 includes the transparent glass plate 6 overcoated with the transparent layer of conducting material 7, e.g. tin oxide. The layer 8 represents a monochromatic photoelectrophoretic ink deposited by an inking roller, brush or other appropriate means on the injecting electrode. The blocking electrode 9 includes a conductive cylindrical core 10 having an outer layer of electrically insulating material 11. The insulating layer is preferably a photoconductive material for reasons that will be given shortly. The cylindrical blocking electrode, i.e. roller electrode, is positioned to form a nip 12 with the injecting electrode. The nip is the area defining an interface between the two electrodes whether or not they are separated by an ink. The ink in the vicinity of the nip is subjected to an electric field by reason of the ground potential 13 coupled to the tin oxide layer of the injecting electrode and the ground referenced power supply 14 coupled to the conductive core 10 of the blocking electrode. The power supply 15 energizes the coratron 16 which is used in forming the electrostatic color mask of the present invention which is discussed more fully elsewhere.

The ink 8 on the injecting electrode is exposed to activating electromagnetic radiation by the exposure mechanism 17 that includes the lamp 19 and the lens 20. The transparency original 21 is a positive color image, i.e. transmits blue, green and red light emitted by the white light generator (lamp 19) in inverse proportion to the density of yellow, magenta and cyan pigment or dye in it. For example, a yellow "A" on a cyan background ideally transmits no blue light in the area of the A and all the blue light in the background area. Lens 20 projects the light transmitted by the original to the layer of ink on the injecting electrode.

The electric field established between the two electrodes is of a polarity causing the ink particles to adhere to the injecting electrode. If the pigments in the nip are exposed to light within their absorption spectrum, they experience a change in polarity and migrate toward the blocking electrode. Consequently, a two dimensional positive ink image is formed on the injecting electrode in a line by line fashion as the roller electrode rotates and travels over the injecting electrode. A negative ink image is also formed on the blocking electrode and it may be used with other ink images to form a composite image as would be understood by the present disclosure and the teachings of the color composing art. For simplicity, the present disclosure is limited to color composition with separation images formed on the injecting electrode.

An image formed on an injecting electrode in the above fashion may be transferred to a record member by several well known techniques. For example, a roller electrode such as roller 9 is coupled to a voltage polarity opposite that used in forming the image and the roller is passed over the injecting electrode. The reverse polarity field pulls the pigments from the injecting electrode toward the roller or transfer electrode. The surface of the transfer electrode may comprise the record member or, alternately, a record member is interposed between the injecting and transfer electrodes. Any transfer apparatus employed is arranged to receive a plurality of images in the exact same location, i.e. in registration. The record member normally includes a wood or cloth fiber paper.

With this background, the three step method of uncorrected color composition is easily understood. A yellow pigment ink is deposited on an injecting electrode 9 and exposed to radiation in imagewise configuration by exposure mechanism 17. As the roller moves over the transparent electrode (here the injecting electrode), the blue light transmitted by original 21 activates the yellow pigments in the vicinity of nip 12 causing them to migrate away leaving yellow pigment in quantities directly proportional to the yellow color in the original 21. This blue separation image, i.e. the yellow pigment image on the injecting electrode, is transferred to a record member and the surfaces of the injecting and blocking electrodes are cleaned. Magenta ink is deposited on the injecting electrode and the roller electrode is passed over it. The green light transmitted by original 21 activates the pigments in the vicinity of the nip causing them to migrate to the blocking electrode. This green separation image is transferred to the record member in registration with the blue separation image transferred earlier. Again, the injecting and blocking electrodes are cleaned and a cyan ink is deposited onto the injecting electrode. As the roller electrode travels over the injecting electrode, the red light activates the cyan pigments in the vicinity of the nip causing them to migrate toward the blocking electrode. The red separation image on the injecting electrode is transferred in registration to the record member bearing the blue and green separation images thereby completing the formation of a full color reproduction on the record member. A fourth separation image made with black pigment ink exposed to light transmitted through a neutral density filter could also be formed in a similar fashion and transferred in registration with the other separation images. This fourth image primarily acts to increase the contrast between colors. Of course, other known color composing techniques or steps known in the art may be utilized if so desired.

The density of the above described separation images may be altered to effect color correction or to enhance one color relative to the others by altering the electric field to which the inks are subjected. The alteration is performed by creating an electrostatic charge pattern on the surface of the blocking electrode, i.e. a surface capable of sustaining the electrostatic charge. The electrostatic charge may either increase or decrease the field depending upon whether migration from the transparent electrode is to be increased or decreased for a particular color correcting or enhancing scheme. For the present color correction scheme, the electrostatic charge increases the field in selected areas to increase the migration of pigment from the injecting electrode. The selected areas are the areas in the original containing magenta and/or cyan for the blue separation image and the areas in the original containing cyan for the green separation image.

In the embodiment shown in FIG. 1, the insulating layer 11 on the roller electrode is a photoconductive material such as amorphous selenium. By way of example, the tin oxide layer 7 on the injecting electrode is coupled to ground potential and the core 10 of the roller 9 is coupled to a high negative potential $-B$. The $-B$ voltage gradient establishes an electric field between the two electrodes of sufficient magnitude to enable the photoelectrophoretic process to work. The photoconductive surface 11 is charged in the dark by the corotron 16 which is coupled to a voltage potential that is the sum of $-B$ and $-A$. The $-A$ voltage gradient between the photoconductive layer 11 and corotron 16 results in substantially a uniform deposition of electrons on layer 11. The voltage potential of the deposited charge is related to the density of the electrons on layer 11. The electron density is dependent upon the rate of electron flow to the surface 11 and the rate of rotation of the roller 9 both of which are controlled by well known techniques. At any rate, the corotron charges the photoconductive surface to some potential near $-A$ thereby increasing the voltage gradient, i.e. the electric field, between the two electrodes 5 and 9.

Next, the charged photoconductive surface 11 is exposed to a light pattern of the green and/or red light emitted from the original 21 depending upon whether the color mask is for a yellow or magenta ink. (The spectral response of selenium photo-conductors, for example, extends from the blue through the red regions of the visible light spectrum when the selenium includes additives such as tellurium, arsenic and/or sulfur.) The intensities of the green and red light are inversely proportional to the amount of magenta or cyan in the original, respectively. The light renders the photoconductor conductive thereby bleeding the charge from the surface of the photoconductor in areas corresponding to areas in the original that contain little of either the magenta and/or cyan colors. In other words, the electrostatic charge or image on the photoconductor after exposure represents a positive image of the magenta and/or cyan colors in the original when the color mask is for a yellow ink or a positive image of the cyan color in the original if the color mask is for a magenta ink. In each case, ink on the injecting and blocking electrodes is a shield that prevents the light emitted by exposure mechanism 17 from erasing the electrostatic image on layer 11.

The relative polarities of the voltages in the above example are illustrative only. Other voltage polarities can be used to effect the desired pigment migrations and the electrostatic charge deposited on layer 11 may include positive ions generated by a corotron rather than electrons.

Once the electrostatic color mask is formed on the surface of the blocking electrode, the blocking electrode is aligned in registration with the image projected to the ink by exposure mechanism 17. When the roller is moved across the injecting electrode, the ink pigment migration is increased in the areas of the electrostatic image because the field strength is greater in those areas. The increased migration reduces the density of the pigment on the injecting electrode in the desired areas in the manner that has been repeatedly explained.

The mask exposure mechanism 22 is used to expose photoconductive layer 11 to the desired light patterns and it includes the lamp 23, aperture lens stop 24, lens 25 and filter 26. Lamp 23 floods the positive transparency original 28 (the same original as transparency 21 but moved to the location of original 28) with white light. The light transmitted by original 28 passes through the slit 29 in the lens stop and is focused onto the periphery of the roller 9 by the lens 25. An appropriate filter 26 is inserted next to the lens to pass green and red light for masking a yellow ink or to pass red light for masking a magenta ink. The lamp, lens stop, lens filter and the roller electrode are all part of a group 30 that are (neglecting the rotation of the roller) stationary relative to one another. Consequently, moving the original 28 relative to the lens stop 24 and at a speed synchronized with the rotational velocity of the roller electrode creates the electrostatic image 31 by discharging the uniform electrostatic charge in the areas struck by light.

The formation of the electrostatic image has been described as occuring separately from the exposure of an ink by the exposure mechanism 17. The two operations can occur simultaneously. For simplicity, the simultaneous operation is illustrated for the case where two identical originals 21 and 28 are available. If only one original is available relatively complex exposure apparatus is used to project a light image of the single original to both the ink and the photoconductor. In either case, the electrostatic mask must be substantially in registration with the image projected onto the ink. The electrostatic image 31 is formed on the roller 9 at a point in its travel such that line 32 in image 31 will coincide with a line 33 in the projected light image 34 when the roller has rotated and translated through a distance to put both lines 32 and 33 in the nip 12. The lines 32 and 33, of course, represent the same line 36 in both the originals 21 and 28. In the system of FIG. 1, this is accomplished by moving the apparatus in group 30 past a stationary original 28, a stationary injecting electrode 5, a stationary exposure mechanism 17 and a stationary original 21. The originals 28 and 21 are oriented to compensate for image inversion and reversion due to the lenses 20 and 25 and the fact that the same image is impressed on two sides of the ink layer 8; namely, from above the ink on the photoconductive layer 11 and from below the ink through the transparent electrode.

The electrostatic image 31 can be formed on surfaces other than a photoconductive surface. For example, layer 11 may comprise a non-photoconductive electrically insulating material. In this case, a grounded conductive stencil is placed over layer 11 and the roller is rotated under the corotron 16. The stencil prevents charge accumulation on layer 11 in the non-image areas of the stencil and allows charge accumulation in the image areas, i.e. the cut out areas of the stencil. Alternatively, a charge pattern can be formed on a photoconductor and be transferred to a non-photoconductive layer 11 by charge induction techniques. Also, the electrostatic image may be created directly on the ink layer 8 or on an insulating layer between the ink and the injecting electrode.

Other variations to the disclosed embodiments will occur to those skilled in the art. For example, both the injecting and blocking electrodes may be flat plates, both may be rollers or the injecting electrode may be a roller and the blocking electrode a plate. Also, the blocking electrode may be transparent rather than the injecting electrode. Quite obviously, exposure mechanisms may be used for projecting images of opaque originals. Many other alterations can be made and all are intended to be encompassed within the scope of the present invention as long as the density of an image on one of the electrodes is changed by altering the electric field effecting the ink particle migration.

What is claimed is:

1. An imaging method comprising
   a. providing a monochromatic photoelectrophoretic ink including electrically photosensitive particles suspended in an electrically insulating fluid, said ink being primarily sensitive to radiation within a first region of the electromagnetic spectrum;
   b. providing a pair of electrodes at least one of which is at least partially transparent to radiation within said first region and one of said electrodes having an insulating surface;

c. arranging a layer of said monochromatic ink between said electrodes;
d. establishing an electric field across said electrodes;
e. exposing said monochromatic ink to a pattern of activating radiation of wavelengths within said first region emitted by an original, wherein said original is capable of emitting wavelengths of radiation both within said first region and outside of said first region; and
f. locating a pattern of electrostatic charge on said insulating surface of said electrode, said charge pattern being in a configuration of the wavelengths outside of said first region emitted by an original, wherein said charge pattern on said insulating surface and said pattern of activating radiation to which said ink is exposed are positioned in registration with each other whereby the density of the ink particles comprising images on the electrodes is altered in the areas of the electrostatic charge.

2. The method of claim 1 wherein said insulating layer comprises a photoconductive material and said electrostatic charge pattern is formed by uniformly charging said photoconductive insulating layer and exposing the charged layer to electromagnetic radiation within said first region emitted by said original.

3. The method of claim 1 further including transferring an image formed on one of said electrodes to a transfer member.

4. The method of claim 3 further including repeating the steps of claim 3 at least one additional time, each subsequently formed image being of a different color than said first image and each subsequently formed image being comprised of a monochromatic ink primarily sensitive to radiation within a region of said spectrum different from said first region, and wherein for each additional image:

the exposure in step (e) is carried out with activating radiation of wavelengths emitted by said original within the region to which said ink is primarily sensitive, the electrostatic charge pattern recited in step (f) is in a configuration of the wavelengths emitted by said original outside of said region to which said ink is primarily sensitive, and each subsequently transferred image is transferred in registration with said first transferred image.

5. In a three step photoelectrophoretic color imaging method wherein yellow, magenta and cyan monochromatic photoelectrophoretic inks are separately exposed in an electric field established between two electrodes one of which has an insulating surface to blue, green and red radiation, respectively, emitted from an original to form blue, green and red separation images that are transferred in registration to a record member, each said monochromatic ink including electrically photosensitive particles suspended in an electrically insulating fluid, the improvement comprising locating an electrostatic charge pattern on the insulating surface of said electrode during the formation of at least one separation image to alter the density of the ink in a separation image, said electrostatic charge pattern being in a configuration of wavelengths emitted by said original outside of the wavelengths emitted by said original within the region to which said ink is primarily sensitive.

6. The method of claim 5 wherein electrostatic charge in the configuration of the green and red light emitted from said original is located adjacent the yellow ink during formation of the blue separation image and electrostatic charge in the configuration of the red light emitted from said original is adjacent the magenta ink during formation of the green separation image.

7. The method of claim 5 wherein said insulating surface is photoconductive and further including charging said photoconductive surface and exposing said charged surface to electromagnetic radiation to dissipate charge from the photoconductive surface in desired areas to form said electrostatic charge pattern.

* * * * *